(12) United States Patent
Meter

(10) Patent No.: US 10,088,183 B2
(45) Date of Patent: Oct. 2, 2018

(54) CLIMATE CHAMBER AND METHOD FOR REGULATING THE TEMPERATURE OF A CLIMATE CHAMBER

(75) Inventor: Tjitze Meter, Veenendaal (NL)

(73) Assignee: Hatch Tech Group B.V., Veenendaal (NL)

( * ) Notice: Subject to any disclaimer, the term of this patent is extended or adjusted under 35 U.S.C. 154(b) by 744 days.

(21) Appl. No.: 13/126,794

(22) PCT Filed: Oct. 29, 2008

(86) PCT No.: PCT/NL2008/050674
§ 371 (c)(1),
(2), (4) Date: Apr. 29, 2011

(87) PCT Pub. No.: WO2010/050797
PCT Pub. Date: May 6, 2010

(65) Prior Publication Data
US 2011/0203787 A1    Aug. 25, 2011

(51) Int. Cl.
*F24F 1/01*   (2011.01)
*F24F 11/00*  (2018.01)
(Continued)

(52) U.S. Cl.
CPC .......... *F24F 11/001* (2013.01); *A01K 41/023* (2013.01); *F24F 11/30* (2018.01); *F24F 2110/00* (2018.01)

(58) Field of Classification Search
CPC ...... A01K 41/023; F24F 11/00; F24F 11/001; F24F 11/0012; F24F 11/0001; F24F 11/053; F24F 11/006; F24F 11/0079
(Continued)

(56) References Cited

U.S. PATENT DOCUMENTS 3,006,320 A * 10/1961 Bailey ........................... 119/319
3,546,893 A * 12/1970 Frudeger ........................ 62/89
(Continued)

FOREIGN PATENT DOCUMENTS

DE    2714895    10/1978
EP    1104987    8/1998
(Continued)

OTHER PUBLICATIONS

NPL 1 "Heat Gain from Electrical Motors"—Engineering Toolbox "https://web.archive.org/web/20071017092146/http://engineeringtoolbox.com/electrical-motors-heat-gain-d_707.html".*
(Continued)

*Primary Examiner* — Jianying Atkisson
*Assistant Examiner* — Antonio R Febles
(74) *Attorney, Agent, or Firm* — Lindsey A. Auerbach; Catherine A. Shultz; N.V. Nederlandsch Octrooibureau

(57) ABSTRACT

A climate chamber that can include a temperature-controlled compartment containing a product such as hatching eggs, chickens, or chicks, a fan which gives off heat during operation, a supply channel extending from the fan up to the compartment, and a temperature sensor provided in the supply channel. An air stream is supplied to the compartment by the fan via the supply channel. The temperature of the air flowing through the supply channel is detected by the temperature sensor. The rotational speed of the ventilator is adjusted as a function of the temperature detected by the temperature sensor for influencing the temperature of air displaced by the fan.

19 Claims, 2 Drawing Sheets

(51) Int. Cl.
*A01K 41/02* (2006.01)
*F24F 11/30* (2018.01)
*F24F 110/00* (2018.01)

(58) Field of Classification Search
USPC ...... 62/91, 99, 441, 178, 186; 119/311, 315, 119/318, 319, 418; 165/287; 236/DIG. 9, 49.3; 454/258
See application file for complete search history.

(56) References Cited

U.S. PATENT DOCUMENTS

| | | | | |
|---|---|---|---|---|
| 3,854,452 A | * | 12/1974 | Bardet | 119/319 |
| 3,923,006 A | * | 12/1975 | Dugan et al. | 119/300 |
| 3,995,443 A | * | 12/1976 | Iversen | F24F 3/06 |
| | | | | 165/299 |
| 4,739,534 A | * | 4/1988 | Wilson | 15/230.16 |
| 4,800,653 A | * | 1/1989 | Steffen | 34/495 |
| 5,410,985 A | | 5/1995 | Schritz | |
| 5,657,720 A | * | 8/1997 | Walters | 119/317 |
| 7,004,401 B2 | * | 2/2006 | Kallestad | 236/49.3 |
| 2002/0017571 A1 | * | 2/2002 | Riley | F24F 11/0017 |
| | | | | 236/49.3 |
| 2006/0144341 A1 | * | 7/2006 | Meter | 119/311 |
| 2007/0048125 A1 | * | 3/2007 | Chou | 415/123 |
| 2009/0211274 A1 | * | 8/2009 | Meng | 62/93 |

FOREIGN PATENT DOCUMENTS

| | | |
|---|---|---|
| FR | 2728761 | 1/1995 |
| GB | 1397422 | 6/1975 |
| GB | 1408880 | 10/1975 |
| JP | 2007-218581 | 8/2007 |

OTHER PUBLICATIONS

NPL 2—Fan Power, Energy and Temperature—https://web.archive.org/web/20080509101556/http://pontyak.com/fans/fanpowerandenergy.html.*

Derwent Abstract for GB 1408880.*

* cited by examiner

CLIMATE CHAMBER AND METHOD FOR REGULATING THE TEMPERATURE OF A CLIMATE CHAMBER

CROSS REFERENCE TO PRIOR APPLICATIONS

The present application is a National Stage Application of PCT International Application No. PCT/NL2008/050674 (filed on Oct. 29, 2008), under 35 U.S.C. § 371, which is hereby incorporated by reference in its entirety.

FIELD OF THE INVENTION

Apparatuses and methods consistent with the present invention relate to regulating the temperature of a climate chamber, and more particularly, the climate chamber may include: a temperature-controlled compartment containing a product such as hatching eggs, chickens, or chicks; a fan; a supply channel extending from the fan up to the compartment; and a temperature sensor.

BACKGROUND OF THE INVENTION

Generally, a climate chamber and a method of regulating the temperature of a climate chamber are known. Applicant, inter alios, sells a climate chamber. The climate chamber and method are described in EP 1 104 987. The known climate chamber comprises a compartment, the temperature of which is controlled during use and which contains a product to be treated or to be stored, consisting in particular of eggs to be hatched, which are referred to as hatching eggs, or chicks. An air stream is passed through this compartment in the horizontal direction. This air stream is conveyed by a fan to one side of the compartment, where it enters the compartment, and leaves the compartment at the opposing, other side of the compartment, and is returned to the first side in order to be supplied again to the compartment and thus to circulate. The compartment is in this case further divided into subcompartments. Adjacent subcompartments are each divided by a perforated wall which is configured as a heat exchanger and is provided for this purpose with fluid pipes so as to be able to bring the wall to a specific temperature for cooling or heating the air stream passing through the wall. At the side of the compartment where the air stream enters the compartment, the compartment wall is accordingly configured as a perforated wall functioning as a heat exchanger. Furthermore, additional heat exchangers (which may or may not be of a different type) can also be provided to bring the air stream to a specific desired temperature. In climate chambers of this type, it is very important that the temperature is kept as accurately as possible at a specific desired value. If the temperature of the air stream differs from a specific desired value and this is corrected utilizing one or more of the heat exchangers, it takes some time before the temperature of the air stream has reached the desired value; in other words, a heat transfer system of this type has a relatively long delay. As a person skilled in the art is aware, heat exchangers react slowly to a regulating action (long response time).

SUMMARY OF THE INVENTION

Exemplary embodiments of the present invention overcome the above disadvantages and other disadvantages not described herein. Also, the present invention is not required to overcome the disadvantages described above, and exemplary embodiments of the present invention may not overcome any of the problems described above.

An object of the present invention is to provide an enhanced method for regulating the temperature of a climate chamber, and an accordingly enhanced climate chamber.

With regard to the method, this object may be achieved, in accordance with embodiments of the invention, by providing a method for regulating the temperature of a climate chamber, the climate chamber including: a temperature-controlled compartment containing a product such as hatching eggs or chickens, in particular chicks; a fan; a supply channel extending from the fan up to the compartment; a temperature sensor provided in the supply channel.

In accordance with embodiments, an air stream is supplied to the compartment by the fan via the supply channel; the temperature of the air flowing through the supply channel being detected by way of the temperature sensor. Moreover, the rotational speed of the fan is adjusted for influencing the temperature of air displaced by the fan. The rotational speed may be adjusted as a function of the temperature detected by the temperature sensor.

With regard to the climate chamber, this object may be achieved, in accordance with embodiments of the invention, by providing a climate chamber that includes a temperature-controlled compartment for a product such as hatching eggs or chickens, in particular chicks, the climate chamber further including: a fan; a supply channel for supplying an air stream to the compartment, which supply channel extends from the fan up to the compartment; a temperature sensor provided in the supply channel for detecting the temperature of the air stream flowing, during use, through the supply channel; and a regulator for regulating the temperature of the air stream supplied, during use, to the compartment.

In accordance with embodiments, the fan is configured to supply an air stream to the compartment via the supply channel, and the regulator is configured to adjust the rotational speed of the fan for influencing the temperature of air displaced by the fan. The rotational speed may be adjusted as a function of the temperature detected by the temperature sensor.

Applicant has found that the heat given off by the fan as a result of friction can be used for regulating the temperature of air flowing along or through the ventilator. In addition, the heat given off by the fan has been found to change rapidly as a result of altering the rotational speed of the fan. As a result of the fact that the air stream is drawn in by the fan, is compressed inside the fan, rubs over the rotating member of the fan, and is subjected to a sort of mixing/stirring process as it passes through the fan, heat is generated which heats the air stream. The amount of this heat generation in the air stream, which passes through the fan, appears to be dependent from the rotational speed and can be used very effectively for regulating or, to put it differently, fine-tuning the temperature of the climate chamber or at least the temperature of the air to be conveyed through the temperature-controlled compartment.

In order to do this, use is made of an in principle undesirable side effect of the fan, namely the undesirable heating of the air stream flowing through or along the fan. Increasing the development of heat, which requires the rotational speed to be increased, will cause the air passing through or along the fan to absorb more heat and thus to become hotter. Reducing the development of heat, which requires the rotational speed to be reduced, will cause the air passing through or along the fan to absorb less heat and thus to cool down relative to the situation preceding the reduction in rotational speed. There is thus no genuine cooling but rather a lesser degree of heating. The temperature in a climate chamber, in particular in the compartment containing the product to be treated, can in this way be regulated or, to put it differently, fine-tuned.

In accordance with a further embodiment of the present invention, therefore, is the use of the rotational speed of a fan of a climate chamber for influencing the temperature of air displaced through the fan.

In fact, Applicant has found that for a well isolated climate chamber, like for instance a climate chamber for hatching chicken, the heating effect of the fan can be sufficient for maintaining the temperature in the climate chamber. In was even found that using the fan, the climate chamber could be heated. For this, no other heating sources were needed. In an embodiment of this, the temperature is regulated based on one or more temperature measurements from temperature sensors in the climate chamber, for instance, in compartments or even sub-compartments of the climate chamber. These well-isolated climate chambers can have walls with a heat transmission of below 0.5 W/m²·K, in embodiments even below 0.4 W/m²·K By placing in the supply channel, in other words, downstream of the fan but still before (i.e., upstream of) the compartment, a temperature sensor with which the temperature of the air flowing through the supply channel is detected, the rotational speed of the fan can be adjusted as a function of the temperature thus detected in order to influence the temperature of the air stream passing through the fan, and thus in the climate chamber. This can be done in various ways.

In accordance with one approach, the temperature detected by the temperature sensor will be compared with a target temperature and the rotational speed of the fan will be increased if the detected temperature is lower than the target temperature and be reduced if the detected temperature is higher than the target temperature. This target temperature may be a preset target temperature or an earlier temperature detected by the temperature sensor; in the latter case, the acting on the rotational speed of the fan is then used for rapid regulating of the temperature if a drop in temperature or a rise in temperature is detected.

In accordance with still another approach, if, for example, an increase in temperature is desired, the rotational speed of the fan will be temporarily increased before reducing the rotational speed as soon as the temperature sensor detects that the desired temperature has been reached or, conversely, if a drop in temperature is desired, the rotational speed can be reduced until the temperature detected by the temperature sensor reveals that the desired temperature has been reached, after which the rotational speed can if appropriate be increased again as soon as any remaining heat exchangers are able to keep the temperature at the desired level. In the latter case, the rotational speed of the fan will not be adjusted, or at least not adjusted to the same degree, as a function of the temperature detected by the temperature sensor provided in the supply channel, and this temperature sensor can optionally be dispensed with. The temperature sensor in the supply channel may well in this case still be useful in order to monitor the adjustment of the air temperature and, if appropriate, to be able to act on this adjustment with greater precision.

In accordance with a further embodiment, the climate chamber can include a return channel extending from the compartment up to the fan, such that air from the compartment is returned to the fan via the return channel. It is, therefore, possible predominantly to have closed circulation of air through the climate chamber, in particular the temperature-controlled compartment, so the temperature of the air stream has to be adjusted only if it changes as the air stream passes through the compartment.

In accordance with a further embodiment of the invention, the climate chamber can include a heat exchanger for influencing the temperature of the air supplied to the compartment, the heat exchanger being provided upstream of the compartment, and, at least if a temperature sensor is provided in the supply channel, downstream of the temperature sensor. Such a heat exchanger, therefore, allows principal regulation and, in the case of a desired regulating action for adjusting the temperature of the air stream, the response time of the system as a whole can be reduced by simultaneously adjusting the rotational speed of the fan temporarily or non-temporarily. The desired regulating action can, therefore, be implemented more rapidly. If a temperature sensor is provided in the supply channel, the rotational speed can be adjusted as a function of the temperature detected thereby in order thus to be able to implement rapid correction in the event of small deviations, so less adjustment via the heat exchanger will be necessary. Generally speaking, the response time of the system as a whole to changes in heat to be monitored, can therefore, be reduced, allowing the system to react more rapidly.

In accordance with a further embodiment, the heat exchanger can include a plate-like body provided with a multiplicity of perforations for allowing through the air stream supplied to the compartment; and with a fluid pipe through which a fluid can flow. The temperature of the plate-like body can, therefore, be brought to a specific desired value by way of a fluid flowing through the fluid pipe and the air stream passing through the perforations can be heated by way of the plate-like body. In particular, such a heat exchanger defines a first lateral wall of the compartment and the return channel connects to the opposing second lateral wall of the compartment.

In climate chambers of this type, as used for the hatching of eggs or the raising of chicks, it is often desirable also to regulate the humidity of the air stream. This can be done by spraying water or another liquid into the air stream. The spraying of liquid into the air stream will cause the temperature of the air stream to drop as a result of evaporation of the liquid. In order to be able to compensate for this, it is also advantageous if the temperature which has dropped as a result of evaporation can be detected. In accordance with embodiments of the invention, it is, therefore, also of further advantageous if a liquid, such as water, is sprayed upstream of the temperature sensor, preferably in the supply channel.

In climate chambers of this type, it is often also desirable to be able to add a gas such as fresh air and/or $CO_2$ and/or another form of gas. Adding a gas will usually influence the temperature of the air stream if the temperature of the added gas differs from that of the air stream. In order then to be able to compensate for this by acting on the rotational speed of the fan, it is best for the addition then to be carried out upstream of the temperature sensor. In accordance with embodiments of the invention, it is, therefore, also of further advantage if a gas, such as fresh air, is supplied upstream of the temperature sensor, preferably in the supply channel.

In accordance with embodiments of the present invention, all references to a fan relate in the broad sense to an air displacement means which is driven in rotation.

In accordance with embodiments of the present invention, all references to chicks relate, in particular, to chickens younger than 5 days, and more particularly, younger than 3 or 2 days.

In accordance with embodiments of the present invention, all references to chickens relate, in particular, to broiler chickens or poultry intended for human consumption.

In accordance with embodiments of the present invention, all references to a climate chamber relate to a broad range of climate chambers. Examples include a climate chamber for the ripening of fruit, a climate chamber for the hatching of eggs, and a climate chamber for the raising of animals, in particular very young animals, such as chickens younger than 4 days or even aged 0 or 1 day.

In accordance with embodiments of the present invention, it is important to be able very accurately to regulate the temperature. Young animals, for example, such as chicks, are not yet able effectively to regulate their body temperature. In order then to raise them optimally, it is important, in particular, in the first initial phase after hatching (birth), to keep these animals at a predefined temperature which is dependent on the type of animal and to regulate this temperature very accurately.

In accordance with embodiments of the present invention, the term "a climate chamber" refers, in particular, to a way of having an internal space (e.g., a compartment) that can regulate the temperature in and throughout the internal space with accuracy of $\pm 3°$ C., more preferably with accuracy of $\pm 1°$ C. or even more accurately (the term "accuracy" refers in this context to the fact that the greatest difference in temperature between any two locations in the space, e.g., the compartment, will be at most the aforementioned accuracy, i.e. at accuracy of $\pm 1°$ C. this difference in temperature will be at most $2°$ C.). Use is in this case made of a climate chamber which has insulated walls and in the interior of which a specific desired temperature-controlled environment is maintained.

BRIEF DESCRIPTION OF THE DRAWINGS

The above and/or other aspects of the present invention will become apparent and more readily appreciated from the following description of exemplary embodiments, taken in conjunction with the accompanying drawings, which includes.

Example

Example

DETAILED DESCRIPTION OF THE INVENTION

Figure 1:
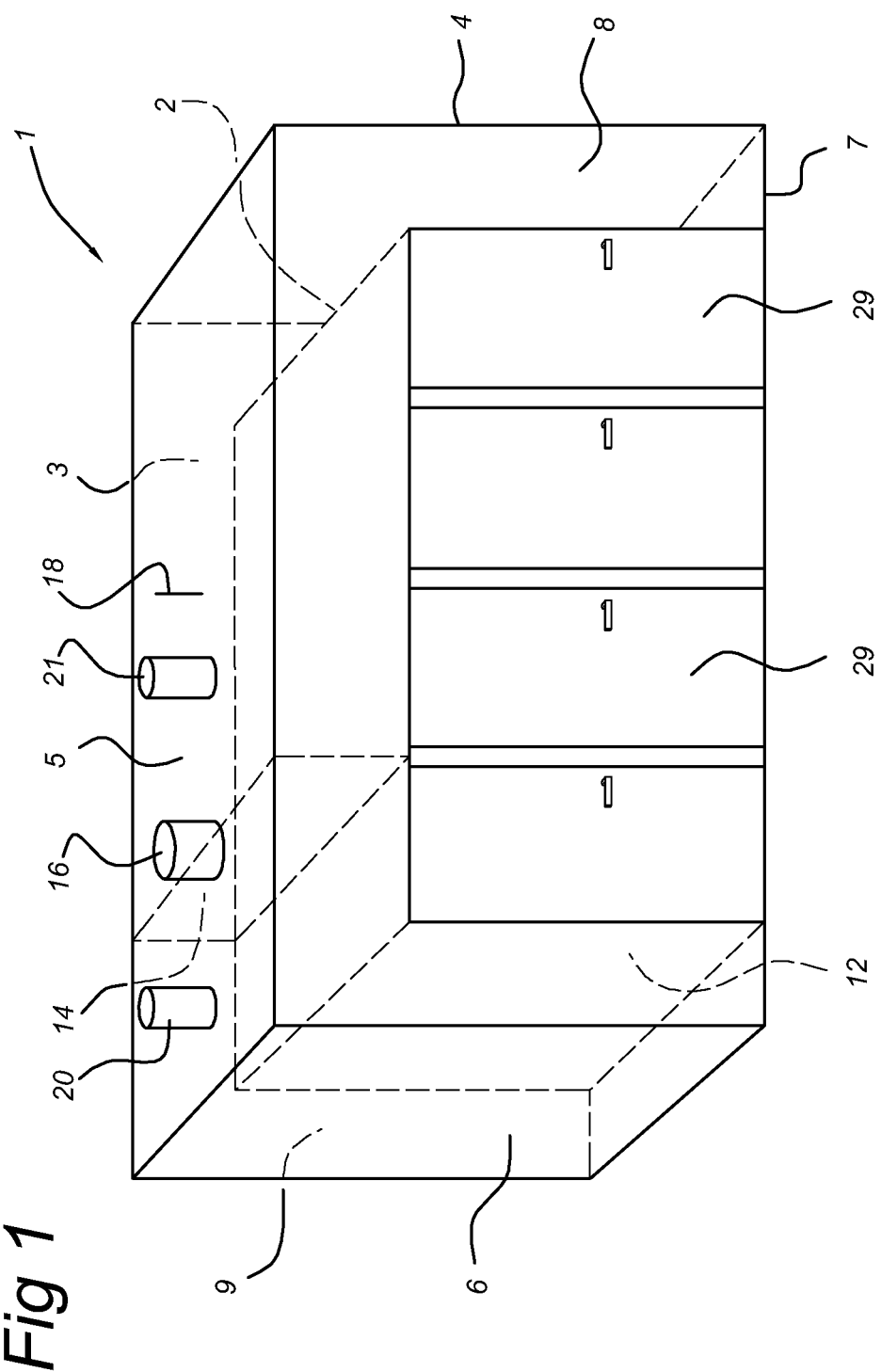
FIG. 1 illustrates a schematic and perspective view of a climate chamber in accordance with an exemplary embodiment of the invention.

Reference will now be made in detail to exemplary embodiments of the present invention, examples of which are illustrated in the accompanying drawings, whereby like reference numerals refer to like elements throughout. Exemplary embodiments are described below, in order to explain the present invention by referring to the example drawing figures.

Figure 2:
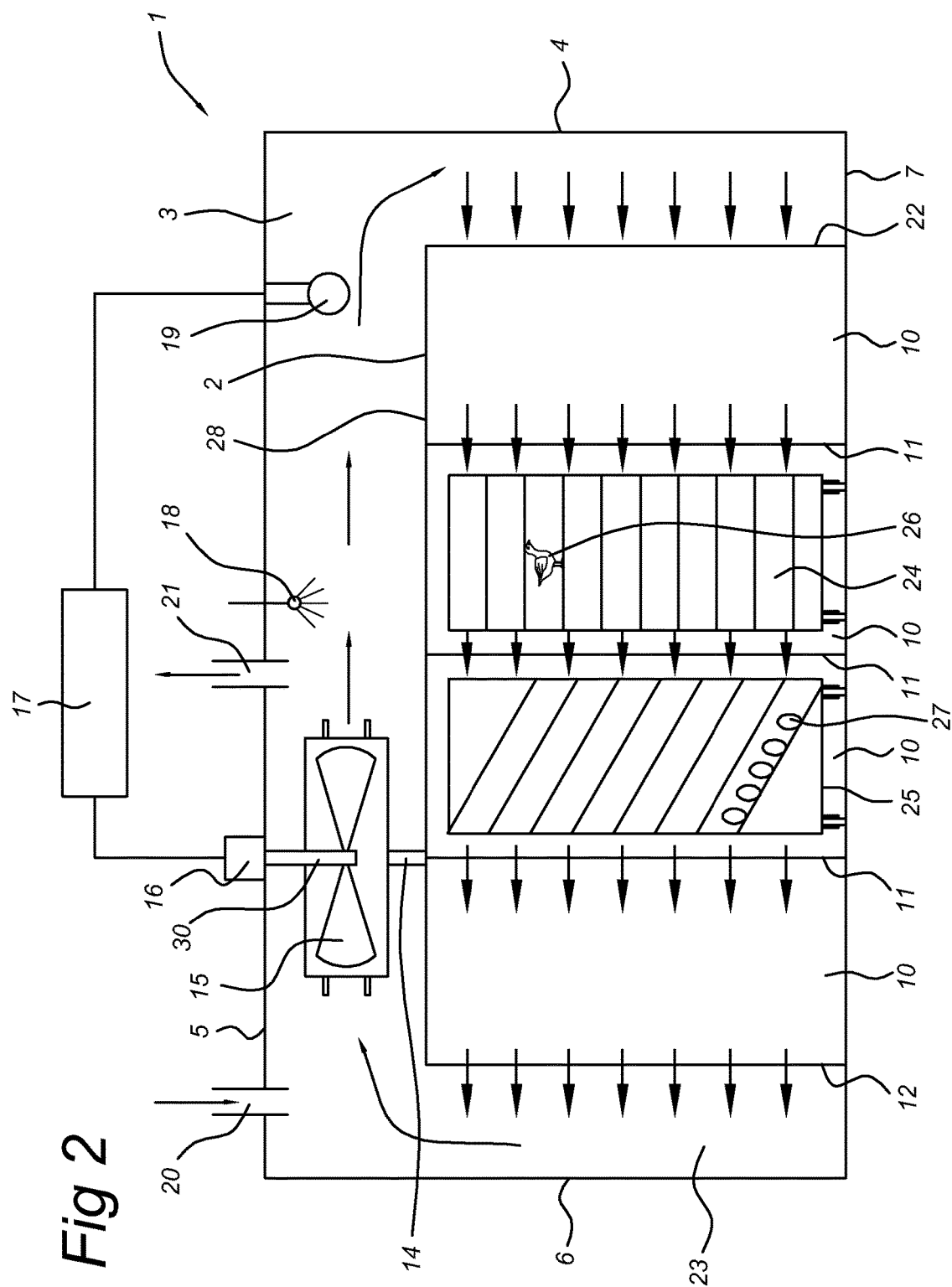
FIG. 2 illustrates a schematic front view of the climate chamber of example FIG. 1, although the front wall thereof has been omitted.

Example FIGS. 1 and 2 illustrate a climate chamber 1 in accordance with embodiments of the invention. The outside of this climate chamber 1 is delimited by two opposing lateral walls 4, 6, a rear wall 9, an opposing front wall 8, a ceiling 5 and a floor 7. In order to be able to regulate the temperature in the interior of the climate chamber as accurately as possible, these walls, the floor and the ceiling will preferably be insulated in their configuration.

The climate chamber contains a compartment 2 through which temperature-controlled air is passed so as to be able to control in the compartment 2 the climatological conditions such as the temperature and/or humidity and/or composition of the air, etc. The compartment 2 is delimited by two opposing lateral walls 12, 22, by a rear wall (not shown) which may coincide with the rear wall 9 of the climate chamber, by a ceiling 28 and by a floor which may coincide with the floor 7 of the climate chamber. In this example, the compartment 2 is divided into four subcompartments 10. However, more or fewer subcompartments 10 are also entirely possible. The subcompartments 10 are each respectively separated from one another by a heat exchanger 11.

Furthermore, the lateral wall 22 is configured as a heat exchanger and the lateral wall 12 can optionally also be configured as a heat exchanger. These heat exchangers 11, 12 and 22 can be configured as described in EP 1 104 987. Such a heat exchanger includes substantially a metal plate with a large number of perforations and also with fluid pipes. In order to be able to influence the temperature of this plate, a fluid, in particular, water having a specific desired temperature, is passed through the fluid pipes, so the plate is kept at or brought to a specific temperature.

The perforated plate is generally positioned vertically upright and has passed through it, in the case of vertical upright positioning of the plate, a horizontal gas stream which arrives transversely to the face of the plate, passes through the perforations in order then to flow onward at the other side of the plate. The temperature of the gas stream can be influenced as the gas stream passes through the plate. If the temperature of the gas stream is to be increased, the plate will have a higher temperature than the gas stream or be brought to a higher temperature, and if the temperature of the gas stream is to be reduced, the plate will have a lower temperature than the gas stream or be brought to a lower temperature. For a more detailed description of an example of a heat exchanger of this type, reference is made to the aforementioned publication EP 1 104 987 and also to the Applicant's application PCT Application No. PCT/NL2007/050370 which was filed on 13 Jul. 2007.

As illustrated in example FIG. 1, the subcompartments 10 can be accessed via doors 29 provided in the front wall 8. Via the doors 29, there can be introduced into the compartments carriages 24, 25 containing products to be treated or to be stored in the subcompartment 10. As is indicated schematically in example FIG. 2, these products may, for example, be chickens 26 or eggs 27.

As is illustrated, in particular, in example FIG. 1, the space between the ceiling 28 of the compartment 2 and the ceiling 5 of the climate chamber 1 is divided by a baffle 14. Placed in this baffle 14 are one or more fans 15 (not illustrated in example FIG. 1) for causing an air stream to circulate as indicated by the arrows in example FIG. 2.

As illustrated in example FIG. 2, the fan 15 draws at the left-hand side air out of a return channel 23 in order to blow the air out at the right-hand side into a supply channel 3. The baffle 14 and/or the fan(s) 15, therefore, form, as it were, the division between the return channel 23 and supply channel 3. The supply channel 3 extends from the fan(s) 15 up to the heat exchanger 22. Via the perforations in the heat exchanger 22, the air then enters the compartment 2 in order to arrive in the first subcompartment 10, to flow horizontally through this first subcompartment 10, to arrive in the second subcompartment 10 via the heat exchanger 11, in order to flow horizontally through this second subcompartment 10 and to arrive in the third subcompartment via the opposing heat exchanger 11, to flow horizontally through this third subcompartment 10 in order subsequently to return to the fourth subcompartment 10 via the opposing heat exchanger 11. After flowing horizontally through the fourth subcompartment 10, the air will arrive in the return channel 23 via the lateral wall 12, which optionally may also be configured as a heat exchanger, in order to flow back to the suction side of the fan 15 via the return channel.

The fan 15 is driven electrically by a drive 16 via a shaft 30. The air displaced by the fan 15 is heated by air layers rubbing over each other, the air moving along the fan 15 and fan housing, compression of air and other aerodynamic phenomena. The amount of heat generated appears to be dependent from the rotational speed of the fan. By controlling this rotational speed the heating experienced by the air passing along the fan can be adjusted. The rotational speed of a fan of this type can be regulated in a broad range of ways known to a person skilled in the art. In the present example, the rotational speed of the fan 15 is regulated by what is known as a frequency regulator 17. Changing the frequency of the alternating current fed to the motor 16 of the fan 15 will change the rotational speed of the fan.

Provided upstream of the fan 15 in the supply channel 3 is a temperature sensor 19 which is actively coupled to the regulator 17. The regulator 17, therefore, is able to adjust the rotational speed of the fan 15 as a function of the temperature detected by the temperature sensor 19. The fan 15 reacts very rapidly, if not immediately then almost without delay, to adjustment of the rotational speed. This also means that the amount of heat which is produced and results from rotating the fan 15 can be altered very rapidly. Less heat will be developed at a relatively low rotational speed than at a relatively high rotational speed. Increasing the rotational speed will generate more heat, so the temperature thereof rises. Reducing the rotational speed will generate less heat and the air stream, therefore, will also absorb less heat as it passes through the fan. The temperature of the air stream as it leaves the fan will, therefore, be lower. This drop in temperature, therefore, is not the result of cooling (the air stream is, after all, still heated as it passes through the fan), but rather the result of less heat being provided. Influencing this (frictional) heat allows the temperature of the air stream passing through the fan 15 to be rapidly influenced.

Example FIG. 2 further illustrates a sprayer 18 with which a liquid, for example, water, can be sprayed into the supply channel 3. This sprayer 18 is provided upstream of the temperature sensor 19 and downstream of the fan 15. The sprayer 18 could also be provided upstream of the fan 15. Spraying of liquid into the gas stream results in evaporation and accordingly a drop in temperature. Increasing the rotational speed of the fan allows this drop in temperature to be compensated for. This compensation for the drop in temperature has the additional advantage that less condensation will occur in the heat exchanger 22 and in the compartment 2.

Example FIG. 2 further illustrates a gas supply 20 via which a gas can be added. This gas supply 20 is, again, provided upstream of the temperature sensor 19 and upstream of the fan 15. An outlet 21 for discharging air is provided downstream of the fan. It should be noted that it is also possible to provide the outlet 21 and inlet 20 elsewhere, such as on the other side of the fan. Generally speaking, the sprayer 18 and/or the gas supply 20 will be provided upstream of the temperature sensor 19 and downstream of the wall 12 of the compartment 2. Preferably, the sprayer 18 and/or the gas supply 20 are provided downstream of the fan 15.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of regulating temperature in a climate chamber for the hatching of eggs or rearing of chicks, the method comprising:
    circulating, by a fan, a stream of air within said climate chamber;
    detecting said temperature of said stream of air;
    comparing said detected temperature with a target temperature; and
    regulating the temperature in the climate chamber within a range by adjusting a temperature of said stream of air by changing a rotational speed of said fan such that the fan blades generate more or less heat to be absorbed by said air in order to maintain a desired temperature in the climate chamber within the range; wherein said stream of air supplied to said climate chamber is returned to said fan via a return channel,
    wherein said rotational speed is increased if said detected temperature is lower than said target temperature to cause the fan blades to generate more heat to be absorbed by said air, and said rotational speed of said fan is reduced to cause the fan blades to generate less heat to be absorbed by said air if said detected temperature is higher than said target temperature wherein the range is +−3 degrees C. from the target temperature.

2. The method of claim 1, wherein said temperature of said stream of air is raised by increasing said rotational speed of said fan.

3. The method of claim 1, wherein heat is generated by an acceleration of said stream of air by said fan.

4. The method of claim 1, wherein heat is generated as a result of an interaction between said stream of air and said fan, said interaction causing at least one of increased friction of said stream of air, compression of said stream of air, and turbulence of said stream of air.

5. The method of claim 1, wherein the range is ±1 degree C. from the target temperature.

6. The method of claim 1, wherein the fan is an electrically driven fan, and the step of regulating the temperature in the climate chamber within a range by adjusting a temperature of said stream of air by changing a rotational speed of said fan comprises changing the frequency of the alternating current fed to the motor of the fan to change the rotational speed of the fan.

7. The method of claim 1, wherein the step of regulating the temperature in the climate chamber within a narrow range by adjusting a temperature of said stream of air by changing a rotational speed of said fan such that the fan blades generate more or less heat to be absorbed by said air in order to maintain a desired temperature in the climate chamber within the narrow range comprises
    adjusting a temperature of said stream of air by changing a rotational speed of said fan such that the fan blades and fan motor together generate more or less heat to be absorbed by said air in order to maintain a desired temperature in the climate chamber within the range.

8. A method of regulating temperature of a climate chamber having a compartment for the hatching of eggs or rearing of chicks, the method comprising:

supplying a stream of air to said compartment via a supply channel;

detecting a temperature of said stream of air flowing through said supply channel; and regulating the temperature in the climate chamber within a range by adjusting a fan speed based on said detected temperature; wherein the adjustment of the fan speed causes the fan blades to generate more or less heat to be absorbed by said stream of air, thereby providing a temperature adjustment of said stream of air supplied to said compartment in order to maintain the temperature within said compartment within the range.

9. The method of claim 8, further comprising:

comparing said detected temperature with a target temperature; and then manipulating said flow rate of said stream of air based on the comparing of said detected temperature with said target temperature.

10. The method of claim 9, wherein manipulating said flow rate comprises:

increasing said flow rate if said detected temperature is lower than said target temperature, and reducing said flow rate if said detected temperature is higher than said target temperature.

11. The method of claim 8, further comprising:

further adjusting, by a heat exchanger, said temperature of said stream of air at a point upstream from said compartment and downstream from a location at which said temperature of said stream of air flowing through said supply channel is detected.

12. The method of claim 8, further comprising:

spraying a liquid into said supply channel at a point upstream from a location at which said temperature of said stream of air flowing through said supply channel is detected.

13. The method of claim 8, further comprising:

adding a gas into said climate chamber at a point upstream from a location at which said temperature of said stream of air flowing through said supply channel is detected.

14. The method of claim 8, wherein the adjustment of the fan speed causes the fan blades and the fan motor to generate more or less heat to be absorbed by said stream of air, thereby providing a temperature adjustment of said stream of air supplied to said compartment in order to maintain the temperature within said compartment within the range.

15. A method of regulating a temperature within a range in a climate chamber for the hatching of eggs or rearing of chicks, the method comprising:

circulating a flow of air through the climate chamber comprising a plurality of adjacent compartments, a return channel and a supply channel with a fan;

regulating a temperature of the flow of air through the compartments within the range by flowing the stream of air through a wall heat exchanger adjacent to at least one of the compartments to influence the temperature of the flow of air through the compartments; and adjusting the temperature of the flow of air by changing the rotational speed of the fan so that the fan blades generate more or less heat to be absorbed by the flow of air to adjust the air temperature of the flow of air to maintain the temperature in the compartments within the range.

16. The method of claim 15, wherein the narrow range is ±3 degrees C.

17. The method of claim 15, wherein the step of regulating a temperature of the flow of air and the step of adjusting the temperature of the flow of air are performed simultaneously.

18. The method of claim 15, wherein the rotational speed of the fan is changed temporarily.

19. The method of claim 15, wherein the step of adjusting the temperature of the flow of air by changing the rotational speed of the fan so that the fan blades generate more or less heat to be absorbed by the flow of air to adjust the air temperature of the flow of air to maintain the temperature in the compartments within the narrow range comprises adjusting the temperature of the flow of air by changing the rotational speed of the fan so that the fan blades and fan motor together generate more or less heat to be absorbed by the flow of air.

\* \* \* \* \*